United States Patent [19]

Shuraym

[11] 4,175,284
[45] Nov. 20, 1979

[54] MULTI-MODE PROCESS CONTROL COMPUTER WITH BIT PROCESSING

[75] Inventor: George P. Shuraym, Dallas, Tex.

[73] Assignee: Texas Instruments Incorporated, Dallas, Tex.

[21] Appl. No.: 418,011

[22] Filed: Nov. 21, 1973

Related U.S. Application Data

[63] Continuation of Ser. No. 178,804, Sep. 8, 1971, abandoned, which is a continuation of Ser. No. 843,614, Jul. 22, 1969, abandoned.

[51] Int. Cl.² ............................................... G06F 7/00
[52] U.S. Cl. .................................................... 364/200
[58] Field of Search .................................... 340/172.5; 364/200 MS File, 900 MS File

[56] References Cited

U.S. PATENT DOCUMENTS

| | | | |
|---|---|---|---|
| 3,386,082 | 5/1968 | Stafford et al. | 340/172.5 |
| 3,461,433 | 8/1969 | Emerson | 340/172.5 |
| 3,470,537 | 9/1969 | Goshorn et al. | 340/172.5 |
| 3,500,466 | 3/1970 | Carleton | 340/172.5 |
| 3,614,746 | 10/1971 | Klinkhamer | 340/172.5 |

Primary Examiner—Joseph M. Thesz
Attorney, Agent, or Firm—Melvin Sharp; Rene' E. Grossman; Thomas G. Devine

[57] ABSTRACT

A data processing system has a processing unit adapted to decode instructions and a memory to store the instructions. A communication register has a plurality of binary bit positions with each bit position having bistable states. A first bit position in the communication register is directly addressed when an instruction is decoded in the processing unit and a second bit position in the communication register is then addressed responsive to the state of the first bit position addressed.

8 Claims, 4 Drawing Figures

MULTI-MODE PROCESS CONTROL COMPUTER WITH BIT PROCESSING

This is a continuation of application Ser. No. 178,804, filed Sept. 8, 1971, now abandoned, which is a continuation of application Ser. No. 843,614, filed July 22, 1969, now abandoned.

This invention relates to a computer system operating in either of two fundamental modes, wherein one mode performs conventional logic and arithmetic functions based upon a conventional data word structure and, in the second mode, single and multiple bit data manipulation (e.g., input/output operations and logical comparisons) is provided by a combination of immediate and direct addressing with a single instruction. In other words, data employed in the second mode may be of variable "word" length.

In the control of processes by computers, the usual computer design has been such that a major effort has been required to adapt a process element to the computer or vice versa. There has been a need for computer construction such as to minimize the task of matching it to process machines.

The present invention is directed to a computer for control of the operation, for example, of a module of a production line. As used herein, a module will be considered to be a major step in a production line consisting of a plurality of process machines with discrete products moving from one machine to the next after spending time and undergoing treatment in each machine. The procedural steps followed within a machine in order to process the product are to take place at the command of the computer. The present invention provides for flexibility, allowing for ready changes in the operation of a production line. By this means, the computer can be an integral part of the module. The present invention involves a computer which satisfies the requirements of process machines by being readily adaptable to a process module.

Historically, computers have been designed on an "I/O word" concept as predominant mode of input-/output (I/O) operation. If the computer word is sixteen bits and its registers are sixteen bits, then the I/O basic unit has been sixteen bits in length. Another legacy of prior computer development is byte or character input/output operation, by which a predetermined, fixed length portion of the word may be accessed. However, process machines ordinarily are not characterized by having input or output signals bunched in sixteen-bit groups, byte groups or character groups. They are, in most cases, single bits or groups of bit combinations as, e.g., two-bit groups or thirteen-bit groups. Therefore, the present invention involves a computer having as its basic building block an I/O of single and multiple bit addressable characteristic, i.e., an I/O of variable bit length. The I/O is a string of bits. Each bit is singly addressable, thus permitting setting a single bit without having to assert concern about the status of fifteen other bits that are a part of its word group. Furthermore, the computer provides for addressing any contiguous group of bits. For example, it provides for reading the fourteen bits of an analog-to-digital converter output all at once with no other bits to be read along with them.

In accordance with the invention a computer system having a central processor, memory and control units is provided with bit processor means for direct control of external machine processes through a communication register channel of variable word length. More particularly, a communication register channel includes multiple bi-stable output elements each having a data input line, a gate input line, a strobe input line and an output line on which a voltage level representative of the state of each of said elements appears. Means are provided for facilitating a connection between the output line of at least one of said elements and one of the external machines for energizing the same when the one element is in a first state and for de-energization when the one element is in a second state. A communication base register provides a base address of one element of the communication register channel and a read-only memory provides a relative address of the one element. Means are provided for adding the relative address of the contents of said base register, for producing a set of gate voltage states representative of the location of the one element in the communication register channel. Logic means having a data input line and lines interconnecting the gate input lines of the communication register channel and output lines from the adding means enable said one element in said communication register channel in accordance with said gate voltage states. Means are thus provided to set said one element in accordance with the state on the data line.

For a more complete understanding of the invention and for further objects and advantages thereof, reference may now be had to the following description taken in conjunction with the accompanying drawings in which.

The embodiment of the invention described herein involves a known computer operating in a conventional mode (Mode I) in which there is provided means capable of operating in a second mode (Mode II). In the first mode, conventional logic and arithmetic functions are performed based upon a word structure. In the second mode, single and multiple bit manipulation capability both in a communication register file and in memory is provided through the addition of a predetermined number of new instructions along with the necessary system components to utilize such instructions.

A computer, manufactured and sold by Texas Instruments Incorporated, Dallas, Tex., known as the 2540 computer, and the instruction set therefor, are described in "Programmers' Handbook for Computers, Digital Data, CP-967/UYK" published by Texas Instruments Incorporated. In the embodiment of the prevent invention, herein described, the 2540 computer is maintained functionally unchanged. To this computer there is added a bit processor with the two processors sharing core memory.

Figure 1:
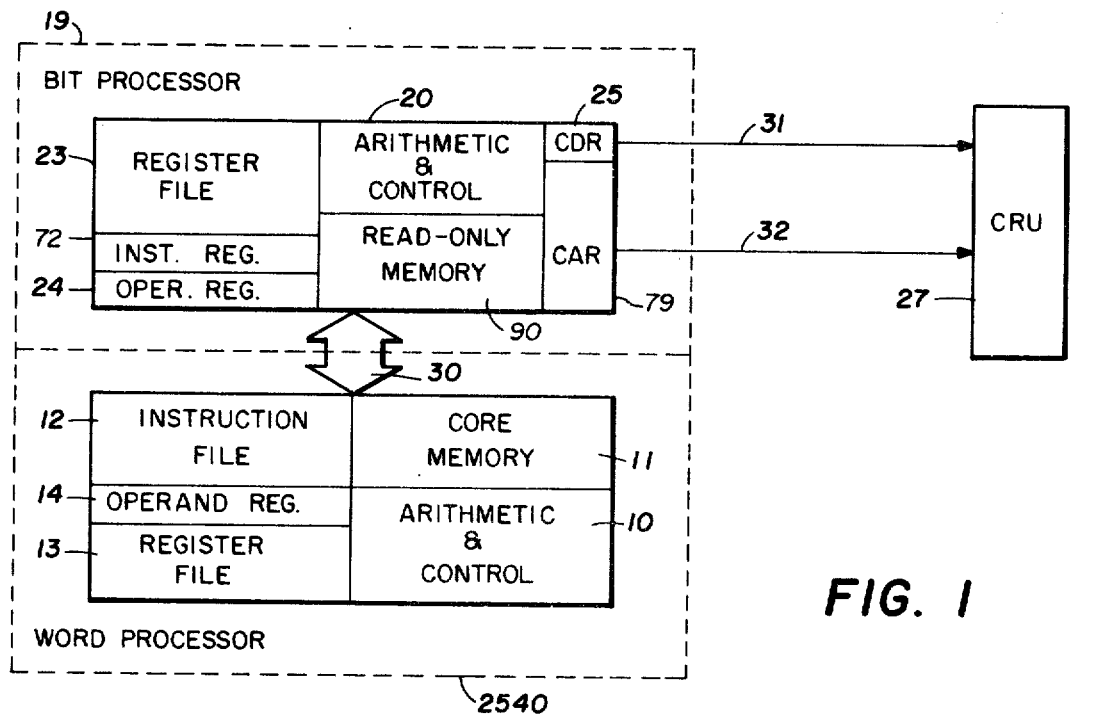
FIG. 1 illustrates a computer system embodying the invention.

The system is illustrated in FIG. 1. The 2540 computer is a word processor which involves an arithmetic and control unit 10, a core memory 11, and instruction file 12, a register file 13 and an operand register 14. The computer is a sixteen bit machine which at the present time is conventional in construction and operation.

To this computer there is added a bit processor 19 which includes an arithmetic and control unit 20, a read-only memory 90, an instruction register 72, a register file 23 and an operand register 24.

Also included is a communication unit data register 25 and a communication unit address register 79. A file, or unit, of communication registers 27 comprises a communication register I/O channel. As indicated by the path 30, there is communication between the word processor 2540 and the bit processor 19. Further, as indicated by paths 31 and 32 there is communication between the bit processor 19 and the communication register unit (CRU) 27.

In addition to the word processing instructions employed by the 2540, additional computational capability is provided at the bit level. The 2540 computer is a sixteen bit machine. Therefore, the following description will be based on such a limitation with the understanding that the invention may be applied to machines of other basic construction.

In the bit processor 19, the data word format accommodates variable length data word of any number of bits from one to sixteen. All data bits of variable length data word are maintained contiguous within each basic sixteen-bit data word. Where signed data is used, the most significant bit (MSB) 0, is the sign bit and the data is represented in two's complement form.

Where single bit data is involved, the data bit is variably specified to be in any bit position within the basic sixteen-bit data word. The bit processor operates as a stored program computer in the same manner as the computers shown and described in U.S. Pat. No. 3,400,371, Amdahl et al, issued Sept. 3, 1968, and U.S. Pat. No, 3,248,701, Eisenstein et al, issued Apr. 26, 1966. The specific single bit addressing and control of external devices by single bit addressing is disclosed specifically in this application in the following description.

The bit processor instruction format involves instruction words of thirty-two bits in length and located in two contiguous sixteen-bit memory words, the first of which, for convenience and orderly operation, is located in an even-memory address.

The bit processor instruction words include eleven fields, though not all eleven fields may be meaningful or present in every instruction. The fields are designated as OP, P, M, R, T1, J, B, G, T2, S, and N. The fields forming the bit processor instruction words are further defined as follows:

OP field:

The OP field is six bits in length occupying bits 0–5 of the instruction word and encodes the primary function of each instruction.

P field:

The P field is one bit in length occupying bit 6 of the instruction word and specifies the memory protect register as the destination register for a 'LOAD' instruction when P is a logical one.

M field:

The M field is ten bits in length occupying bits 6–15 of the instruction word and encodes an address for either the communications address register (CAR) or a memory address register (not illustrated) of the core memory, depending on the instruction being executed.

R field:

The R field is three bits in length occupying bits 13–15 of the instruction word and encodes the source or destination register in the bit processor register file. The contents of the R field will hereafter be referred to as $R_{BP}$.

T1 field:

The T1 field is one bit in length occupying bit 16 of the instruction word. This field shall have one of three meanings depending upon which type of instruction is being executed. For single-bit instructions (i.e., instructions which designate single bit manipulation) the T1 field contains the value of the digital output data. For multiple-bit instructions (i.e., instructions which designate manipulation of a specific plurality of bits) the T1 field specifies immediate data. For sequence control instructions the T1 field specifies the condition for resumption of processing.

J field:

The J field is one bit in length occupying bit 17 of the instruction word and indicates a transfer from MODE II to MODE I.

B field:

The B field is four bits in length occupying bits 17–20 respectively and specifies the bit position number within a sixteen bit data word.

G field:

The G field is five bits in length occupying bits 16–20 respectively and specifies the number of data bits to be transferred.

T2 field:

The T2 field is one bit in length occupying bit 21 in single-bit instructions and contains the value of digital comparison data to be used in mode 2 logical comparisons.

S field:

The S field is one bit in length occupying bit 21 of the instruction word and specifies the sign bit for immediate area.

N field:

The N field is sixteen bits in length occupying bits 16–31 or ten bits in length occupying bits 22–31 depending on the instruction being executed. This field encodes an address for a communications address register, a memory address register of the core memory, an event counter (EC), or a program counter (PC). Additionally, the N field is capable of use as immediate data.

Of the two operating modes provided by the present invention, MODE I specifies program counter control of the instruction execution sequence and MODE II specifies event counter control thereof. The mode is capable of conditional change by several of the instructions. Each of the instructions of the bit processor is capable of execution in either MODE I or MODE II. Occurrence of 2540 instructions in MODE II generates an interrupt signal and executes as a no-op. When operating in MODE I, the contents of the event counter are retained and when operating in MODE II, the contents of the program counter are retained.

The core memory is write-protected. The write-protected area in memory may be assigned Address 00 through Address (MPR)-2. Initiation of a write cycle to the protected area causes two actions to occur: (1) the memory cycle is completed as a non-destructive read operation, and (2) a signal is provided to interrupt the processor.

Three conventional timers (not illustrated) are provided as an integral portion of the bit processor. A loaded timer decrements once within each 1 millisecond period. When the contents of the timer become equal to zero the timer continues decrementing and a signal is generated for use as a processor interrupt. The resolution of each timer is 30 microseconds and the accuracy is preferably 100 nanoseconds. The timers are located within the bit processor register file. Suitable timers are described on Pages 251–275 of *Digital Computer System*

*Principles,* by Herbert Hellerman, published by McGraw Hill, 1967.

A 'LOAD' instruction which addresses Timer N (N=1, 2, 3) activates that timer. A STOR instruction which addresses timer N (N=1, 2, 3) deactivates that timer, but does not disturb the contents thereof.

The bit processor register file 23 consists of eight sixteen-bit, program addressable registers. These registers are addressed by the R field as described below:

| | |
|---|---|
| $R_1 =$ | 0 MDB Machine Data Base Register |
| | 1 MPB Machine Procedure Base Register |
| | 2 CRB Communication Base Register |
| | 3 SFB Software Flag Base Register |
| | 4 EC Event Counter |
| | 5 TM1 Timer 1 Register |
| | 6 TM2 Timer 2 Register |
| | 7 TM3 Timer 3 Register |

Machine Data Base (MDB):

The contents of this register may be a algebraically added to the operand address. The sum is the effective address of core memory operands required by Bit Processor instructions.

Machine Procedure Base (MPB):

When the program sequence is controlled by the Event Counter, (i.e., Mode II operation), the Machine Procedure Base Register contents are added algebraically to the Event Counter contents to obtain the effective address in core memory of the next instruction (procedure). A suitable counter is described on Pages 251-257 of *Digital Computer System Principles* by Herbert Hellerman, and published by McGraw Hill, 1967.

Communication Base Reg. (CRB):

The contents of this register may be algebraically added to the source of the communication register address as specified by the particular instruction being executed. The sum is the effective address to be loaded into the Communication Address Register.

Software Flag Base Register (SFB):

The contents of this register may be algebraically added to the operand address. The sum provides the effective address of core memory operands required by Bit Processor instructions which operate on Software Flags.

Event Counter:

This register controls the execution sequence when the computer is in MODE II. The contents of this counter are added to the contents of the MPB register to obtain the effective instruction address in all MODE II instruction cycles.

Timer-Registers 1, 2 and 3:

These registers are available as real-time clocks and decrement once per millisecond when 'active'. A Timer register is activated when addressed by a bit processor 'LOAD' instruction and is de-activated when addressed by a Bit Processor STOR instruction.

The instruction repertoire of the bit processor consists of seventeen instructions specifically developed for use in process control programs and applications. There are three basic groups of instructions.

Single-Bit Instructions:

Seven instructions are provided in this group for bit-addressing capability within a sixteen bit data word and generally control the value of single-bit digital data or perform program transfers conditioned upon the value of single-bit digital data.

Multiple-Bit Instructions:

Seven instructions are provided in this group and generally operate upon sixteen bit data words. Two instructions within this group additionally provide variable-length data word capability from one to sixteen bits.

Sequence Control Instructions:

Three instructions are provided in this group to control the sequence of instruction execution based upon the current operating 'MODE'.

Of particular interest in the present case are the single bit instructions and the implementation thereof. The following description and Tables I-VII detail the instructions set:

DOUT—(Digital Output)

The contents of the N field is added algebraically to the contents of the CRB to obtain the effective address of the communications register. The CDR is loaded with the content of the T1 field and an output digital data transfer is initiated. Either the program counter or the event counter is incremented by two, depending on the mode, as set out in Table I.

TABLE I

| 0 | 5 6 | | 15 16 | | 22 | 31 |
|---|---|---|---|---|---|---|
| DOUT | | | T1 | | N | |

(N) + (CRB) → (CAR) - communication address register
(T1) → (CDR) - communication data register
0 → (DIR) - mode flip-flop
MODE I (PC) + 2 → (PC) - Program counter
MODE II (EC) + 2 → (EC) - Event counter DIDO—(Digital Input Comparison/Conditional Digital Output)

The contents of the M field is added algebraically to the contents of the CRB to obtain the effective address of the communications register. An input digital data transfer is initiated (CRU DATA→(CDR)) and the contents of the CDR is compared with the contents of the T2 field. When in Mode I, if the data are not equal the program counter is incremented by four; if equal, the CDR is loaded with the content of the T1 field, an output digital data transfer to the communications register at the effective address specified by the N field and the CRB is initiated, and the program counter is incremented by two. When in Mode II, if the data are not equal the program counter is incremented by two and the operating mode switched to Mode I; if equal, the above output digital data transfer is initiated and the event counter is incremented by two, as shown in Table II.

TABLE II

| 0 | 5 6 | | 15 16 17 | | 20 21 | 22 | 31 |
|---|---|---|---|---|---|---|---|
| DIDO | M | | T1 | | T2 | N | |

(M) + (CRB) → (CAR)
1 → (DIR)
CRU DATA → (CDR)

| (T2) = (CDR) | (T2) ≠ (CDR) |
|---|---|
| (N) + (CRB) → (CAR) | MODE I (PC) + 4 → (PC) |
| 0 → (DIR) | MODE II (PC) + 2 → (PC) |
| (T1) → (CDR) | 1 →(MODE) |
| MODE I (PC) + 2 → (PC) | |
| MODE II (EC) + 2 → (EC) | |

DICJ—(Digital Input Comparison/Conditional Jump)

The contents of the M field is added algebraically to the contents of the CRB to obtain the effective address of the communications register. An input digital data transfer is initiated (CRU DATA→(CDR)) and the contents of the CDR is compared with the contents of the T2 field. When in Mode I, if the data are equal the program counter is incremented by two; if not equal, the program counter is loaded with the contents of the N field. When in Mode II, if the data are equal the event counter is incremented by two; if not equal, the event counter is loaded with the contents of the N field.

TABLE III

| 0 | 5 6 | 15 16 | 21 | 22 | 31 |
|---|---|---|---|---|---|
| DICJ | M | | T2 | | N |

(M) + (CRB) → (CAR)
1 → (DIR)
CRU DATA → (CDR)

| (T2) = (CDR) | (T2) ≠ (CDR) |
|---|---|
| MODE I (PC) + 2 → (PC) | MODE I (N) → (PC) |
| MODE II (EC) + 2 → (ED) | MODE II (N) → (EC) |

SETF—(Set Software Flag)

The contents of the N field is added algebraically to the contents of the SFB to obtain the effective address of the memory word containing the bit to be altered. The contents of the T1 field is stored into the memory word at the bit position specified by the contents of the B field, B=0000 indicating bit position '0'. Either the program counter or the event counter is incremented by two, depending on the mode.

TABLE IV

| 0 | 5 | 15 16 | 17 | 20 | 22 | 31 |
|---|---|---|---|---|---|---|
| SET F | | | T1 | B | | N |

(T1) → ((N) + (SFB))
(B)
MODE I (PC) + 2 → (PC)
MODE II (EC) + 2 → (EC)

TSFF—(Test Software Flag)

The contents of the M field is added algebraically to the contents of the SFB to obtain the effective address of the memory word containing the bit to be tested. The contents of the T2 field is compared with the memory word at the bit position specified by the contents of the B field, B=0000 indicating bit position '0'. When in Mode I, if the contents are equal, the program counter is incremented by two; if not equal, the program counter is incremented by four. When in Mode II, if the contents are equal, the event counter is incremented by two; if not equal, the program counter is incremented by two and the operating mode is switched to Mode I.

TABLE V

| 0 | 5 6 | 15 16 | 17 | 20 21 | 22 | 31 |
|---|---|---|---|---|---|---|
| TSFF | M | | B | T2 | | |

| ((M) + (SFB)) = (T2) | ((M) + (SFB)) ≠ (T2) |
|---|---|
| (B) | (B) |
| MODE I (PC) + 2 → (PC) | MODE I (PC) + 4 → (PC) |
| MODE II (EC) + 2 → (EC) | MODE II (PC) + 2 → (PC) |
| | 1 → (MODE) |

TDIN—(Test Digital Input)

The contents of the M field is added algebraically to the contents of the CRB to obtain the effective address of the communications register. An input digital data transfer is initiated (CRU DATA→(CDR)) and the contents of the CDR is compared with the contents of the T2 field. When in Mode I, if the data are equal the program counter is incremented by two; if not equal, it is incremented by four. When in Mode II, if the data are equal the event counter is incremented by two; if not equal, the program counter is incremented by two and the operating mode switched to Mode I.

TABLE VI

| 0 | 5 6 | 15 16 | 21 | 31 |
|---|---|---|---|---|
| TDIN | M | | T2 | |

(M) + (CRB) → (CAR)
1 → (DIR)
CRU DATA → (CDR)

| (T2) = (CDR) | (T2) ≠ (CDR) |
|---|---|
| MODE I (PC) + 2 → (PC) | MODE I (PC) + 4 → (PC) |
| MODE II (EC) + 2 → (EC) | MODE II (PC) + 2 → (PC) |
| | 1 → (MODE) |

SFCJ—(Software Flag Comparison/Conditional Jump)

The contents of the M field is added algebraically to the contents of the SFB to obtain the effective address of the memory word containing the bit to be compared. The contents of the T2 field is compared with the contents of the memory word at the bit position specified by the contents of the B field, B=0000 indicating bit position '0'. When in Mode I, if the contents are equal, the program counter is incremented by two; if not equal, the program counter is loaded with the contents of the N field. When in Mode II, if the contents are equal, the event counter is incremented by two; if not equal, the event counter is loaded with the contents of the N field.

TABLE VII

| 0 | 5 6 | 15 | 16 | 17 | 20 | 21 | 22 | |
|---|---|---|---|---|---|---|---|---|
| SFCJ | M | | | B | | T2 | N | |

| (T2) = ((M) + (SFB)) | (T2) ≠ ((M) + (SFB)) |
|---|---|
| (B) | (B) |
| MODE I (PC) + 2 → (PC) | MODE I (N) → (PC) |
| MODE II (EC) + 2 → (EC) | MODE II (N) → (EC) |

The multiple bit instruction set is detailed in the following description and Tables VIII–XIV.

AOUT—(Analog Output)

The number of bits specified by the G field (G=00001 indicating one bit) are transferred sequentially to the CRU up to a maximum of 16 bits. The data to be transferred is located at the core memory address specified by the algebraic sum of the N field and the MDB. Bit position fifteen is transferred to the CRU at CRU address (M)+(CRB). Bit position 16−(G) is transferred to CRU address (M)+(CRB)+1−(G).

If G=00000, then the ten bits of the N field are treated as immediate data and transferred sequentially, bit 31 to CRU address (M)+(CRB) through bit 22 to CRU address (M)+(CRB)−9.

Either the program counter or the event counter is incremented by two, depending on the mode.

TABLE VIII

| 0 | 5 6 | 15 16 | 20 21 | 22 | 31 |
|---|-----|-------|-------|-----|-----|
| AOUT | M | G | ╳ | N | |

| G = 0 | G ≠ 0 |
|-------|-------|
| $10^{10} \to$ (SC) | (N) + (MDB) → (JMA) |
| (N) → (SR) | (G) → (SC) |
| | MEMORY DATA → (SR) |
| | (M) + (CRB) → (CAR) |

0 → (DIR)

(SR$_{LSB}$) → (CDR  ⟵  This process is
(SC) − 1 → (SC)          continued until
Right Shift → (SR)       (SC) = 0
(CAR − 1) → (CAR)
MODE I (PC) + 2 → (PC)
MODE II (EC) + 2 → (EC)

INPF—(Input Fixed Number of Bits)

The number of bits specified by the G field (G=00001 indicating one bit) are transferred sequentially from the CRU. The data from the effective CRU address specified by the algebraic sum of the contents of the M field and the CRB shall be transferred to the core memory word addressed by the algebraic sum of the N field and the MDB. The data from CRU address (M)+(CRB)+1−(G) shall be transferred to bit position 16−(G). Either the program counter or the event counter is incremented by two, depending on the mode.

TABLE IX

| 0 | 5 6 | 15 16 | 20 21 | 22 | 31 |
|---|-----|-------|-------|-----|-----|
| INPF | M | G | ╳ | N | |

(M) + (CRB) ——▶ (CAR)

1 ——▶ (DIR)

(G (17−20)) ——▶ SC

CRU DATA ——▶ (CDR)  ⟵  This process is
(CDR) ——▶ (SR$_{MSB}$)    continued until
(SC) − 1 ——▶ (SC)         (SC) = 0
(CAR) − 1 ——▶ (CAR)

0 ——▶ (SR$_{MSB}$)  ⟵  This process is
(SC) − 1 ——▶ (SC)       continued until
                         (SC) = (G (17−20))/

(N) + (MDB) ——▶ (JMA)

(SR) ——▶ (JMD)

MODE I (PC) + 2 ——▶ (PC)

MODE II (EC) + 2 ——▶ (EC)

Load—(Load Register)

MODE I:

When P=0 the contents of memory location N is loaded into the register specified by R$_{BP}$.

When P=1 the contents of memory location N is loaded into the Memory Protect Register (MPR).

MODE II:

The contents of memory location (n)+(MDB) is loaded into the register specified by R$_{BP}$.

In this mode only the 10 least significant bits of N are utilized.

Either the program counter or the event counter is incremented by two, depending on the mode.

TABLE X

| 0 | 5 6 | 7 | 12 13 | 15 16 | 31 |
|---|-----|---|-------|-------|-----|
| LOAD | P | ╳ | R$_{BP}$ | N | |

MODE I
| (P) = 0 | (P) = 1 |
|---------|---------|
| ((N)) → ((R$_{BP}$)) | ((N)) → (MPR) |
| (PC) + 2 → (PC) | (PC) + 2 → (PC) |

MODE II
((N) + MDB → ((R$_{BP}$))
(EC) + 2 → (EC)

STOR—(Store Register)

MODE I:

The contents of register R$_{BP}$ is stored into memory location N.

MODE II:

The contents of register R$_{BP}$ is stored into the memory location specified by (N)+(MDB).

In this mode only the least significant 10 bits of N are utilized.

TABLE XI

| 0 | 5 6 | 12 13 | 15 16 | 31 |
|---|-----|-------|-------|-----|
| STOR | ╳ | R$_{BP}$ | N | |

| MODE I | MODE II |
|--------|---------|
| ((R$_{BP}$)) → ((N)) | ((R$_{BP}$)) → ((N) + (MDB)) |
| (PC) + 2 → (PC) | (EC) + 2 → (EC) |

CHNG—(Change Memory Location)

The memory location specified by the algebraic sum of the M field and the MDB is loaded with the contents of the memory location specified by the algebraic sum of the N field and the MDB.

If (T1)=1, then the ten bits of the N field are treated as immediate data, the S field being propagated to the left to provide a signed, sixteen bit data word.

When in Mode I, the program counter is incremented by two.

When in Mode II, and (J)=0, the event counter is incremented by two; if (J)=1 the program counter and the event counter are each incremented by two and the operating mode switched to Mode I.

TABLE XII

| 0 | 5 | 15 16 | 17 | 18 | 21 | 22 | 31 |
|---|---|-------|----|----|-----|----|-----|
| CHNG | M | T1 | J | ╳ | | S | N |

| T1 = 0 | T1 = 1 |
|--------|--------|
| ((N) + (MDB))→((M) + (NDB)) | (N)$_{(SIGNED)}$→((M) + (MDB)) |

| (J) = 0 | (J) = 1 |
|---------|---------|
| MODE I (PC) + 2 → (PC) | MODE I (PC) + 2 → (PC) |
| MODE II (EC) + 2 → (EC) | MODE II (PC) + 2 → (PC) |
| | (EC) + 2 → (EC) |
| | 1 → (MODE) |

COMP—(Compare Data)

The contents of the memory location specified by the algebraic sum of the M field and the MDB is subtracted from the contents of the memory location specified by the algebraic sum of the N field and the MDB. If the difference is zero, either the program counter or the event counter is incremented by six, depending on the mode.

If the difference is positive and non-zero, either the program counter or the event counter is incremented by two; if negative, it is incremented by four.

If (T1)=1, then the ten bits of the N field are treated as immediate data, the S field being propagated to the left to provide a signed, sixteen bit data word.

XIII

| 0 | 5 6 | | 15 16 | 17 | 21 22 | | 31 |
|---|---|---|---|---|---|---|---|
| COMP | M | T1 | ><  | S | N | | |

(T1) = 0
(N) + (MDB) → (JMA)
MEMORY DATA → (SR)
(M) +(MDB) → (JMA)
(SR) − MEMDATA = (+)
MODE I (PC) + 2 → (PC)
MODE II (EC) + 2 → (EC)

(T1) = 1
(N) → (SR)
(M) + (MDB) → (JMA)
(SR) − MEMDATA = (−)
MODE I (PC) + 4 → (PC)
MODE II (EC) + 4 → (EC)

(SR) − MEMDATA = 0
MODE I (PC) + 6 → (PC)
MODE II (EC) + 6 → (EC)

TWTL—(Test Within Two Limits)

The effective address specified by the algebraic sum of the contents of the M field and the MDB is forced even by ignoring the least significant bit (LSB). The two sixteen-bit words at the even and odd locations provide the lower and upper test limits, respectively. The data to be tested is a sixteen-bit memory word at the effective address specified by the algebraic sum of the contents of the N field and the MDB.

Depending on the mode, either the program counter or the event counter is incremented. If the algebraic data is equal to or between the limits, the appropriate counter is incremented by six, if the data is less positive than the lower limit, the appropriate counter is incremented by four. If the data is more positive than the upper limit, the appropriate counter is incremented by two.

TABLE XIV

| 0 | 5 6 | | 15 16 | 21 22 | | 31 |
|---|---|---|---|---|---|---|
| TWTL | M | ><  | | N | | |

(N) + (MDB) → (JMA)
MEMORY DATA → (WORKING REGISTER)
(M) + (MDB) → (JMA)
(VALUE) ≧ LSH OF MEMORY DATA
(VALUE) ≦ MSH OF MEMORY DATA
VALUE < LOWER LIMIT VALUE > UPPER LIMIT
MOKE I (PC) + 4 → (PC) MODE I (PC) + 2 → (PC)
MODE II (EC) + 4 → (EC) MODE II (EC) + 2 → (EC)
LL ≦ VALUE ≦ UL
MODE I (PC) + 6 → (PC)
MODE II (EC) + 6 → (EC)

Sequence control instructions are detailed in the following description and Tables XV-XVII.

CHMD—(Change Mode)

The contents of the N field is loaded into the program counter when in Mode II. The operating Mode is changed to the opposite mode.

TABLE XV

| 0 | 5 6 | 15 16 | | 31 |
|---|---|---|---|---|
| CHMD | | ><  | N | |

MODE I  $\overline{\rightarrow}$ (MODE)
MODE II (N) → (PC)
1 → (MODE)

WAIT—(Wait for NO-OP)

If (T1)=0 this instruction acts as a NO-OP.

If (T1)=1, instruction execution will be repeated until the Resume Switch (a panel switch on the bit processor-not illustrated) is depressed. When the Resume Switch is depressed either the program counter or the event counter will be incremented by two, depending on the mode.

TABLE XVI

| 0 | 5 6 | 15 | 16 | 17 | 20 21 | 31 |
|---|---|---|---|---|---|---|
| WAIT | | ><  | T1 | B | ><  | |

(T1) = 0 + RESUME = 1      (T1) = 1 · RESUME = 0
MODE I (PC) + 2 → (PC)     MODE I (PC) + 0 → (PC)
MODE II (EC) + 2 → (EC)    MODE II (EC) + 0 → (EC)

JUMP—(Unconditional Branch)

MODE I:
Bits 16–31 of the instruction word are loaded into the program counter.

MODE II:
If (T1)=1 the contents of the N field is loaded into the Event Counter.

If (T1)=0 the contents of the memory location specified by (n)+(MDB) is loaded into the Event Counter.

TABLE XVII

| 0 | 5 6 | 15 | 16 | 17 | 21 22 | 31 |
|---|---|---|---|---|---|---|
| JUMP | | ><  | T1 | ><  | N | |

MODE I              MODE II
(N) → (PC)          T1 = 1          T1 = 0
                    (N) → (EC)      ((N) + (MDB)) → (EC)

FIG. 2

Certain of the relationships between central memory and the registers identified and discussed above are illustrated in FIG. 2 in order to provide further detail as to the execution and use of bit and multiple addressing.

In Mode I, memory 11 is employed in a conventional manner. For example, in response to the program counter 70 an instruction 71 is fetched and placed in the instruction register 72. The instruction fetched and placed in register 72, indicated by path 73, directs an operation via the code of its OP field (such as ADD) and, by way of an address code, identifies a data word 74 at a memory address. Data word 74 is then fetched and placed in an accumulator 75 by way of path 76 in performance of the ADD operation.

An event counter 77 is provided for control of Mode II operation. Additionally, a machine procedure base register 76 is provided. In response to each increment of EC 77, the contents of MPB 76 are added to the contents of EC 77 to specify the location in memory 11 of the instruction 78 to be fetched. Instruction 78 is then fetched from memory and placed in the instruction register 72, as indicated by path 73.

It will be noted that base addressing only is used for bit processing instructions. For this purpose, a communication base register (CRB) 179 is provided to generate an address at the bit level in the CRU 27. Further, a software flag base register (SFB) 80 and a machine data base register (MDB) 81 are provided for addressing memory 11 at the bit and word level, respectively.

In order to address the CRU 27, part of the contents of IR 72 are added to the contents of CRB 179 to specify a single bit in the CRU 27, as will be further explained in connection with FIG. 3.

If the MDB 81 is employed, memory 11 is addressed on the word basis by adding part of the contents from IR 72 to the contents of MDB 81 to specify word 83 as indicated by path 84.

If SFB 80 is employed, memory is addressed at the bit level by adding part of the contents from IR 72 to the contents of SFB 80 to specify bit 85 as indicated by path 86. Thus, in the present invention, an important aspect involves the provisions for addressing the CRU 27 at the bit level as well as bit level addressing memory 11.

As will be seen from the instructions (Table XV), a shift from Mode I to Mode II is by means of the instruction "change mode."

The shift from Mode II to Mode I can occur on:
a. testing on a bit in memory 11
b. testing on a bit in CRU 27
c. the instruction "change mode" (Table XV)
d. the instruction "change memory location" (Table XII)

A read only memory (ROM) 90 is provided. In a preferred embodiment of the invention, the memory 90 comprised 256, 70-bit words. The memory 90 has a program counter 91 to carry out micro-control of the instructions executed by the system, as well understood by those skilled in the art and described in *Digital Computer System Principles,* by Herbert Hellerman, and published by McGraw Hill, 1967. Micro-control is also described in detail in the above-mentioned U.S. Pat. No. 3,400,371.

Figure 3:
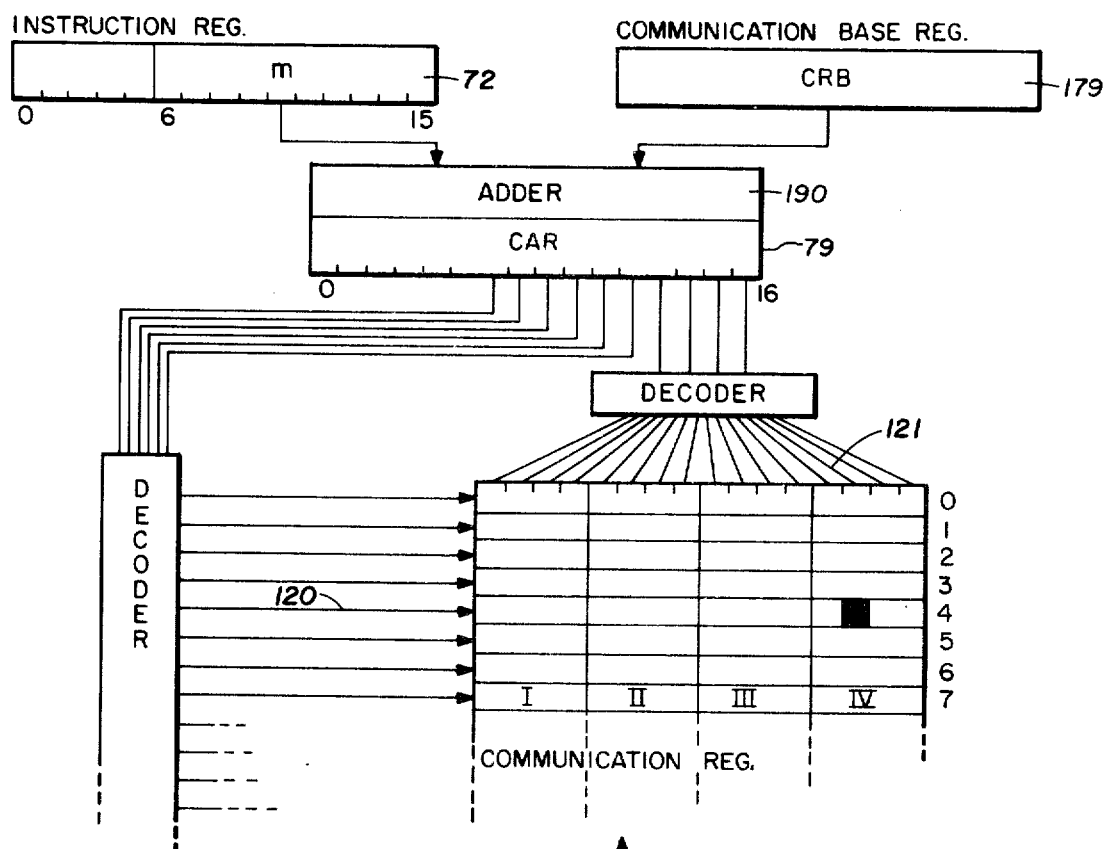
FIG. 3 is a more detailed illustration involving bit addressing in a communication register.
Figure 2:
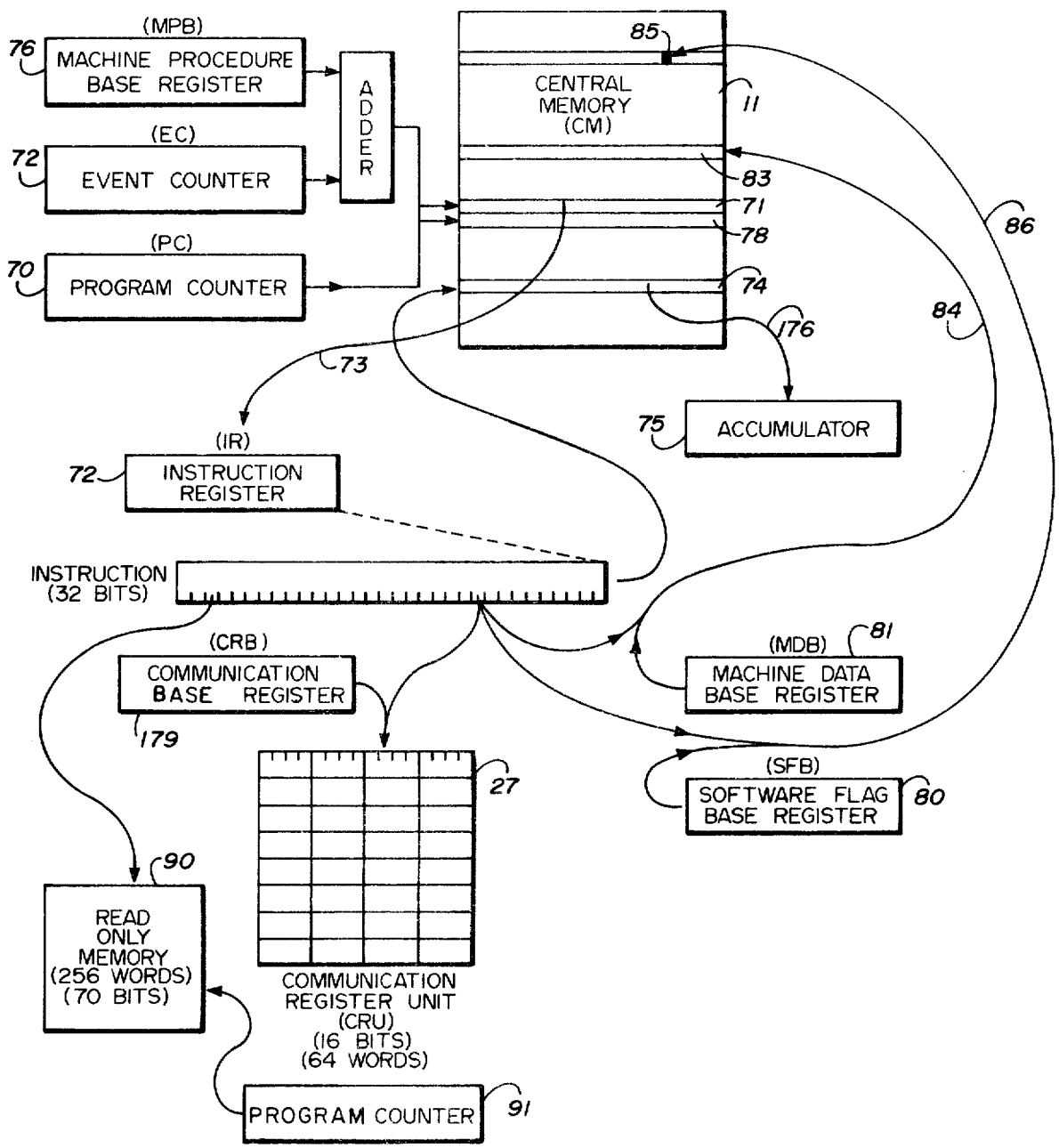
FIG. 2 illustrates bit addressing.

With the general relationship of the registers shown in FIG. 2 and with the specification set out in Tables I-XVII, the operations involving addressing the CRU 27 at the bit level will further be understood from the FIG. 3.

FIG. 3

In FIG. 3, single bit addressing in CRU 27 has been illustrated. Bit and multiple bit addressing, collectively will be referred to herein as an operation responsive to a bit processing instruction such as in Tables I-VII and VIII-XII. In the example of FIG. 3, the instruction having a format such as in Table VIII with ten bits in the M field is added algebraically to the contents of CRB 179 by means of an adder 190. The sum is stored in CAR 79 and designates the first address in the communication register file 27. The CAR 79 is a sixteen bit register, thus, making it possible to address $2^{16}$ bits in the communication register 27. In an embodiment of the invention, 32 registers of 16 bits each were employed for control of a process module. The output of adder 190 designates a specific bit position within CRU 27.

In the example illustrated, the bit position addressed by the decoded output of adder 190 from CAR 79 is the second bit position in the fourth quarter of register 4. The system generates a direct bit position address. By addressing a particular bit, the bit is enabled so that it can be set in dependence upon a data signal on a data line leading to or from the CRU 27 for input or output of data or control functions. Further details of the register structure are illustrated in FIG. 4.

FIG. 4

Figure 4:
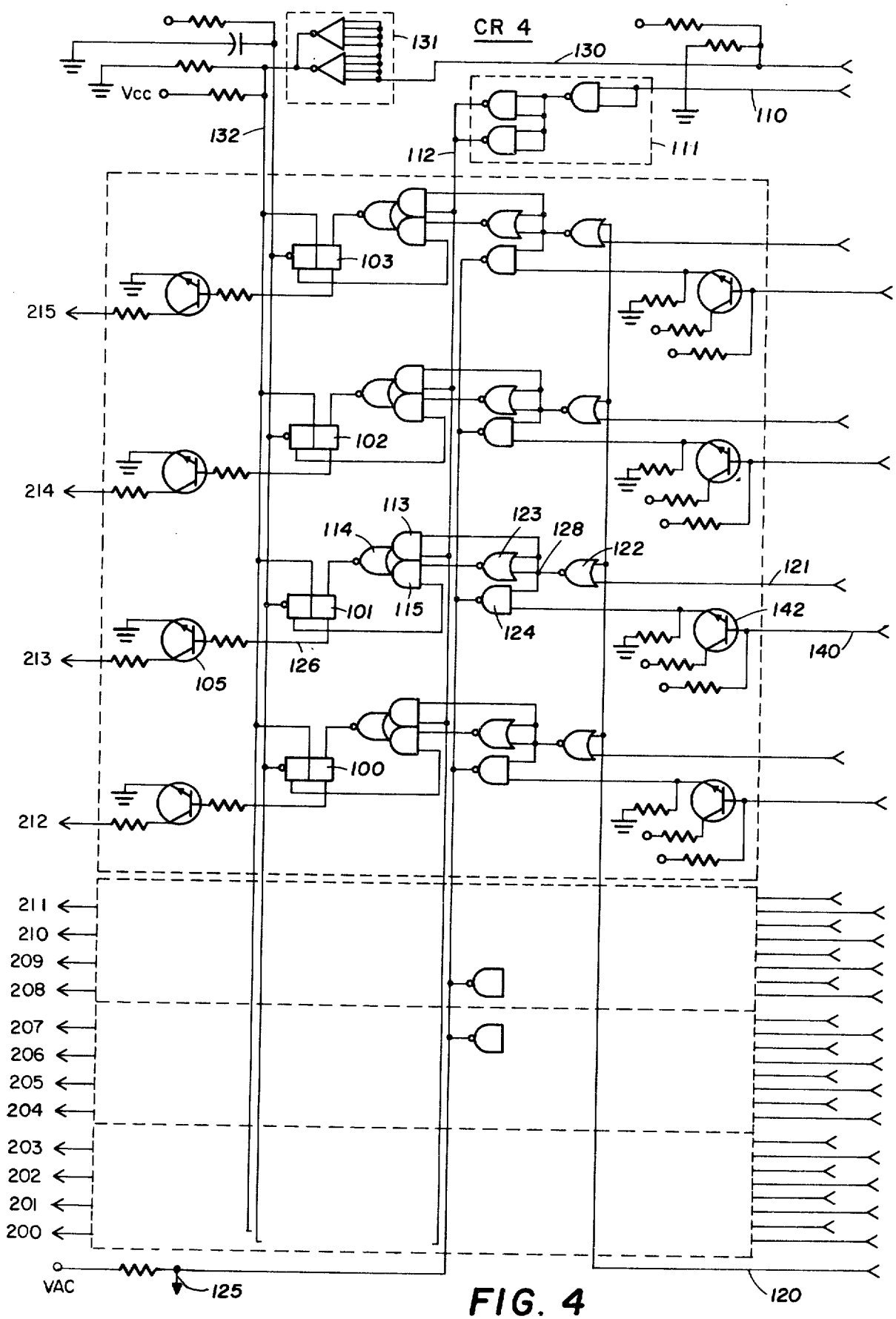
FIG. 4 is a detailed diagram of one-fourth of one communication register.

In FIG. 4 the structure of ¼ (Quarter IV) of communication register 4 of FIG. 3 has been shown as representative of all the other registers and is labelled "CR 4". The unit shown in FIG. 4 was formed on one circuit board and is of integrated circuit construction.

Output lines 200-215 extend from CR 4 and lead to conveniently accessible plugs (not shown) to which control lines connected to I/O devices can be completed for I/O control by change of state of a single bit. Output lines 200-203 extend from the first quarter; lines 204-207, from the second quarter; lines 208-211 from the third quarter; and lines 212-215, from the fourth quarter. Consistent with the example illustrated in FIG. 2, the addressing is such that line 213 would be energized to place a voltage state thereon for control of a process machine connected thereto, e.g., to start or to stop a motor.

A strobe or clock signal is applied as an input by way of line 50 to all sixteen bi-stable output elements of CR 4. The four output flip-flops 100, 101, 102, and 103, comprising the fourth quarter of register CR 4, are shown. Line 213 is energized from flip-flop 101 by way of transistor 105. The flip-flop is a type D flip-flop for which the following truth table is characteristic.

TABLE XVIII

| INPUT | t Q | t + 1 Q |
|---|---|---|
| 0 | 0 | 0 |
| 0 | 1 | 0 |
| 1 | 0 | 1 |
| 1 | 1 | 1 |

Where:
t is the present state of the flip-flop;
t+1 is the state of the flip-flop at the next clock pulse;
I represents the input state, and
Q represents the output state.

All of the logic circuits in the communication register file are identical so that only the circuit associated with the flip-flop 101 leading to output line 213 will be described in detail. A data or value signal (value) is applied to the system by way of line 110. Unit 111 is provided in line 110 in order to enhance the drive capabilities of the value of the data of line 110. The drive signal on line 112 is thus applied to one input of an AND gate 113 which operates in conjunction with a NAND gate 114 and a second AND gate 115 for control of flip-flop 101.

The word is addressed by word selector line 120 corresponding with line 120 of FIG. 3 and the bit is addressed by way of line 121, also designated on FIG. 3. Lines 120 and 121 are applied to a NOR gate 122, the output of which is applied to both inputs of a NOR gate 123 whose output is applied to AND gate 115. The output of NOR gate 122 is also connected to one input of NAND gate 124 whose output is connected to an output line 125. Line 125 is employed for the input of data to the computer and extends to a data input channel. In contrast, line 213, leading from buffer amplifier 105, is employed for output of data from the computer to an external device.

The second input of NAND gate 124 is also supplied by the output of NOR gate 122, as is one input of AND gate 113. The second input of AND gate 115 is supplied by one output of the flip-flop 101. The second output of the flip-flop 101 is connected to the base of transistor 105 by way of line 126. The output of NAND gate 114 is connected to the input of flip-flop 101.

A strobe or clock line 130 is connected through unit 131 to line 132 which is connected to the strobe input on each of the flip-flops 100-103 as well as the flip-flops in the other three sections of the CR 4.

Thus, in order to energize line 213, the coincidence of voltage states (negations thereof) on lines 120 and 121 will, through the logic thus described, change the state of flip-flop 101.

In order to input data to the computer through CR 4, line 140 is energized as a data input line simultaneously with energization of lines 120 and 121 so that a signal will appear on the output line 125. Line 140 is connected into the system by way of an emitter-follower buffer transistor 142. In control of a device external to the machine, the bit condition is completely specified by the state at point 128. This is then combined with the value and a clock pulse to set the bit in the state indicated by the voltage on the value line 110. The value of any flip-flop not altered by input logic is reinserted in operation of the AND gate 115, for example.

Only the fourth quarter of CR 4 has been shown in detail. There are sixteen bit input selector lines in the CR 4 and one word selector line. There also is but one value input line 110 for data flowing from the computer. There are sixteen value input lines such as line 140 for data flowing from an external device to the computer. In the system such as shown in FIG. 4, any single bit can be set either for flow to or from the computer. Furthermore, as indicated in the above tables, any number of contiguous bits can be selectively set by sequentially energizing the bit input lines such as line 121.

What is claimed is:

1. A data processing system comprising:
   (a) a memory for storing instructions,
   (b) an instruction processing unit adapted to decode said instructions,
   (c) a communication register having a plurality of binary bit positions, each bit position having a bistable state,
   (d) an external controlling device connected directly to a first bit position in said communication register for setting said first bit position to either one of said bistable states,
   (e) an externally controlled device connected directly to a second bit position of said communication register, said controlled device being responsive to and controlled by the state of said second bit position,
   (f) logic means responsive to an instruction decoded by said instruction processing unit for directly addressing said first and second bit positions, said logic means including:
      (i) testing means for testing the condition of said first bit position as set by said controlling device, and
      (ii) means for setting said second bit position in said communication register to either one of said bistable states, and
   (g) wherein said controlling device provides a bit of data to said data processing system via said first bit position in said communication register and wherein said controlled device in controlled by the state of said second bit position in said communication register.

2. The data processing system according to claim 1 wherein said testing means includes means responsive to instructions decoded by said instruction processing unit for generating a predetermined single bit of data and means for comparing the state of said first bit position and said predetermined single bit of data.

3. A data processing system comprising:
   (a) a memory for storing instructions,
   (b) an instruction processing unit adapted to decode said instructions,
   (c) a communication register having a plurality of binary bit positions, each bit position having a bistable state,
   (d) an external controlling device connected directly to a first bit position in said communication register for setting said first bit position to either one of said bistable states.
   (e) logic means responsive to an instruction decoded by said instruction processing unit for directly addressing said first bit position, said logic means including:
      (i) testing means for testing the condition of said first bit position as set by said controlling device, and
      (ii) means responsive to the state of said first bit position directly addressed in said communication register for controlling said logic means to directly address a second bit position in said communication register in dependence upon the state of said first bit position.

4. The data processing system according to claim 3 wherein said testing means includes means responsive to instructions decoded by said instruction processing unit for generating a predetermined single bit of data and means for comparing the state of said first bit position and said predetermined single bit of data.

5. A data processing system according to claim 4 wherein logic means includes means responsive to said comparison means for directly addressing said second bit position in said communication register.

6. A data processing system comprising:
   (a) a memory for storing instructions,
   (b) an instruction processing unit adapted to decode said instructions,
   (c) a communication register having a plurality of binary bit positions, each bit position having a bistable state,
   (d) an external controlling device connected directly to a first bit position in said communication register for setting said first bit position to either one of said bistable states,
   (e) logic means responsive to an instruction decoded by said instruction processing unit for directly addressing said first and second bit positions, said logic means including:
      (i) testing means for testing the condition of said first bit position as set by said controlling device, and (ii) means responsive to the state of said first bit position directly addressed in said communication register for causing said logic means for initiating the decoding of a new instruction by said instruction processing unit.

7. The data processing system according to claim 6 wherein said testing means includes means responsive to instructions decoded by said instruction processing unit for generating a predetermined single bit of data and means for comparing the state of said first bit position and said predetermined single bit of data.

8. A data processing system according to claim 7 wherein said logic means includes means responsive to said comparison means for initiating the decoding of a new instruction by said instruction processing unit.

* * * * *